(No Model.) 2 Sheets—Sheet 1.
E. G. TEED.
REFUSE BURNER.

No. 398,671. Patented Feb. 26, 1889.

WITNESSES:
Edward Wolff
William Miller

INVENTOR:
Edgar G. Teed.
BY Van Santvoord & Hauff (No Model.) 2 Sheets—Sheet 2.
E. G. TEED.
REFUSE BURNER.
No. 398,671. Patented Feb. 26, 1889.
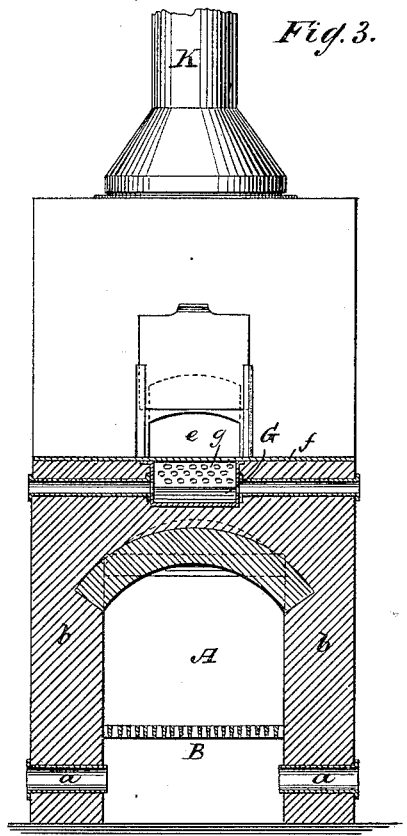
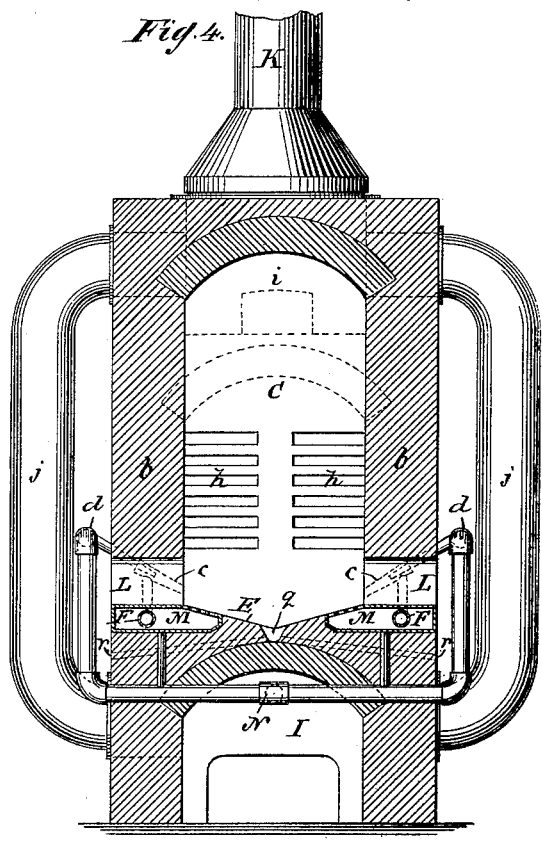
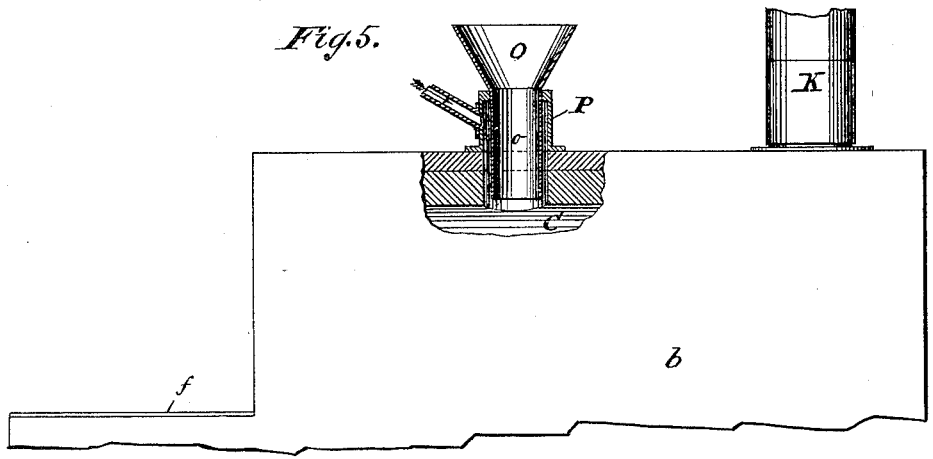
WITNESSES:
Eduard Wolff
William Miller
INVENTOR:
Edgar G. Teed
BY Van Santvoord & Hauff
ATTORNEYS.

UNITED STATES PATENT OFFICE.

EDGAR G. TEED, OF BROOKLYN, NEW YORK.

REFUSE-BURNER.

SPECIFICATION forming part of Letters Patent No. 398,671, dated February 26, 1889.

Application filed April 19, 1888. Serial No. 271,236. (No model.)

*To all whom it may concern:*

Be it known that I, EDGAR G. TEED, a citizen of the United States, residing at Brooklyn, in the county of Kings and State of New York, have invented new and useful Improvements in Refuse-Burners, of which the following is a specification.

This invention has for its object to provide novel means for cremating refuse matter or garbage; and the invention consists in the features of construction and combination of devices hereinafter described and claimed, reference being made to the accompanying drawings, illustrating my invention, in which—

Figure 1:
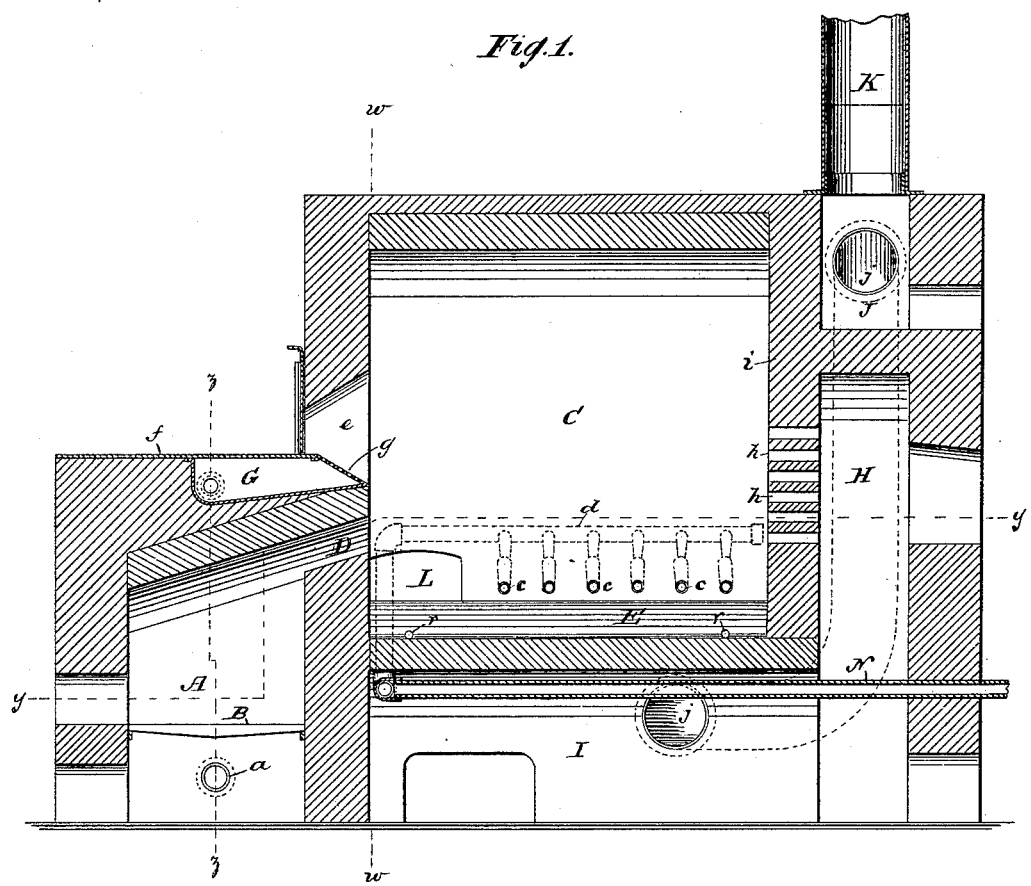
Figure 2:
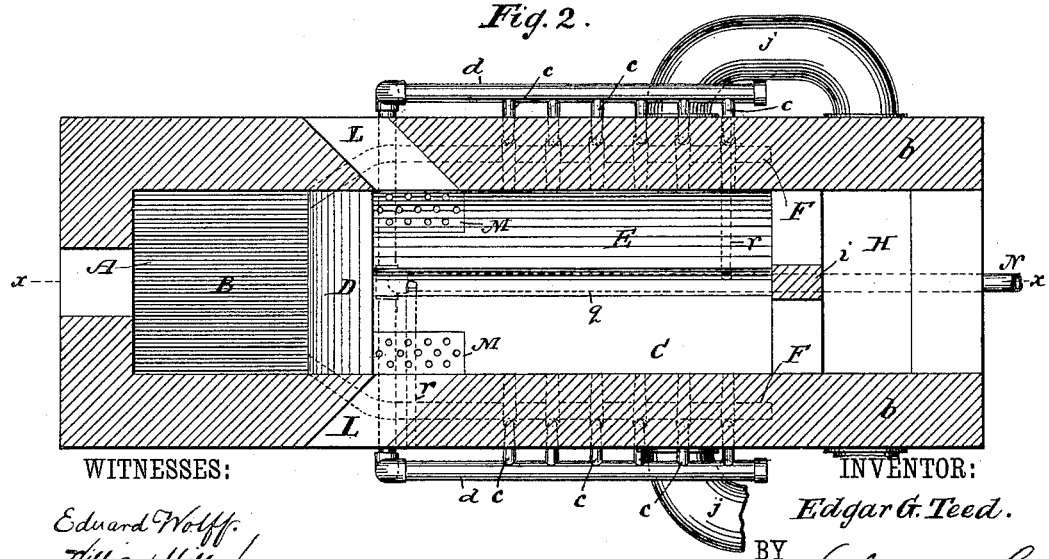

Figure 1 represents a longitudinal vertical section in the plane $x\ x$, Fig. 2. Fig. 2 is a horizontal section thereof in the plane $y\ y$, Fig. 1. Fig. 3 is a transverse vertical section in the plane $z\ z$, Fig. 1. Fig. 4 is a similar section in the plane $w\ w$, Fig. 2. Fig. 5 is a sectional elevation of a modified form of the apparatus for introducing the charge into the combustion-chamber.

Similar letters indicate corresponding parts.

In these drawings, the letter A designates the furnace, which is provided with a suitable grate, B.

C is the combustion-chamber, into which the charge of refuse matter is introduced. The flames and heated gases from the furnace A enter the combustion-chamber C primarily through a flue, D, Figs. 1 and 2, leading from the top of the furnace to the lower portion of the combustion-chamber, such flue best being inclined, so as to direct the issuing flame upward. A blast-pipe or blast-pipes, $a$ $a$, entering the furnace A beneath the grate B, in combination with the chimney-draft, force the flame and gases through the flue D. The hearth E, forming the bottom of the combustion-chamber, is somewhat trough-shaped, and supplies the place of the iron grate usually found in furnaces of this description.

In substituting a hearth for the iron grate I avoid the continual expense and trouble involved by the use of the latter, it having been found by experience that such grates rapidly burn out or become so clinkered that they necessitate the shutting down of the furnace.

To supply heat and air directly above the hearth E, flues F F are formed in the opposite side walls, $b\ b$, of the combustion-chamber, which flues are, in connection with the furnace A, above the grate B thereof. These flues extend parallel with the hearth and throughout the entire length of the same, their inner ends being closed. At intervals in the length of the flues F F, Figs. 2 and 4, are located inclined blast-nozzles $c\ c$, which receive fresh air under pressure from common headers, $d$. The inner ends of these nozzles enter the combustion-chamber above the hearth, and the air supplied by the blast, together with the flames from the furnace, impinges in the form of jets upon the refuse matter on the hearth and consumes the same, an intense heat being the result of the arrangement.

The charging-opening $e$, Figs. 1 to 4, is located in the front of the combustion-chamber and at or about the center of its height. In front of the same is a flat surface, which can be formed by the top plate, $f$, upon which the refuse matter is thrown prior to its introduction into the combustion-chamber. In furnaces for burning refuse matter great difficulty has been heretofore experienced in charging the furnace, owing to the upward current of air and flame caused by the blast beneath the grate and the draft from the chimney, the said current sweeping the charge upward and out of the charging-opening whenever said opening was uncovered in the act of feeding the charge. I overcome this difficulty by providing a counter-blast which overcomes the pressure in the combustion-chamber and promptly carries the charge into the said chamber. This blast can be provided for by placing an air-box, G, directly beneath the charging-opening $e$ in the front wall of the combustion-chamber, said air-box having an inclined perforated front, $g$, which directs the blast of air upward and inward and throws the charge inward. This air-blast also serves to separate the refuse matter, the lighter portions of the charge being thrown in the direction of the arch of the combustion-chamber, while the heavier portions fall to the hearth below. The lighter portions of the refuse matter are consumed while suspended in the body of the combustion-chamber, and the heavier particles are consumed on the hearth. Any suitable form of door or gate can be applied to the charging-opening; for instance, as shown in the drawings, a sliding gate may be used.

The gases and light ashes from the combustion of the matter make their escape through transverse flues $h\ h$ in the rear wall, $i$, of the combustion-chamber. These flues are made small in cross-section, in order that none of the floating matter can be carried out of the combustion-chamber until it is thoroughly consumed. The flues $h\ h$ communicate with a vertical flue, H, Figs. 1 and 2, located behind the wall $i$ of the combustion-chamber. This flue communicates with an ash-pit, I, located directly below the hearth E, and the gases led thereto aid in heating the said hearth. From the ash-pit the gases are conducted to a smoke-box, J, by external flues, $j\ j$. A chimney, K, connected with the smoke-box leads the gases to the open air.

To remove the ashes from the ash-pit I, suitable doors are provided at the sides and at one end thereof.

In order to clean out the hearth without interrupting the operation of the furnace, I provide oblique cleaning-openings L L, which extend through the side walls on a level with the hearth. A suitable blast is provided, which prevents the gases and flames making their exit from said openings when the doors thereof are opened. This can be accomplished by setting an air-box, M, under each opening L L, which air-box has an oblique perforated side that directs a blast of air inward.

The arrangement of the pipes for supplying air to the various nozzles may be according to any approved plan. In the example shown in the drawings I run the main supply-pipe N through the ash-pit I in close proximity to the hearth, so that the air supplied may be thoroughly heated. From this main pipe branch pipes are led, in a well-known manner, to the various points where the blast is to be applied. Suitable valves are also provided for regulating the blast at any of the points of application. Any well-known form of blower or compressor (not shown) can be used for supplying the blast. When the charge is to be introduced at the top of the furnace, Fig. 5, I firmly mount a hopper, O, in its proper position, said hopper being provided with a spout, $o$. This spout is surrounded by a nozzle, P, extending downward below the end of the spout. A blast-pipe, $p$, is connected with the nozzle P, and a blast of air is forced through the same, causing the refuse matter in the hopper to enter the combustion-chamber, while at the same time the exit of gas, flame, or smoke is prevented.

In order that the molten particles of metal, glass, &c., may be removed, I form a longitudinal well, $q$, in the hearth, from which extend channels $r$, leading to the exterior of the furnace. These channels are kept plugged in the usual manner, the plugs being removed from time to time to permit the escape of the molten mass.

What I claim as new, and desire to secure by Letters Patent, is—

1. The combination of the furnace A, the combustion-chamber C, located at one side thereof and having the charging-opening $e$ in its front wall, the hearth E in the bottom of the combustion-chamber, a flue, D, leading from the upper part of the furnace into the lower part of the combustion-chamber above the hearth, an air-blast delivering air into the combustion-chamber above the hearth and into the furnace below the grate, and an air-blower having its discharge-mouth extending through the front wall of the combustion-chamber beneath its charging-opening for directing an air-blast into the combustion-chamber to counteract the pressure therein and carry the charge thereinto, substantially as described.

2. The combination, with a furnace, A, a combustion-chamber, C, communicating therewith and having a charging-opening in its front wall, and an air-blast under the grate in the furnace, of a counter air-blower having its discharge-mouth extending through the front wall of the combustion-chamber directly beneath its charging-opening to overcome the pressure in the combustion-chamber produced by the air-blast under the grate and the chimney and to carry the charge into the combustion-chamber, substantially as described.

3. The combination of the furnace A, the combustion-chamber C at one side thereof, having the charging-opening $e$ and bottom hearth, the flue D, leading from the upper part of the furnace-chamber into the combustion-chamber above the hearth, the flues F, located along the sides of the combustion-chamber and connecting at one end with the furnace-chamber above the grate, the blast-nozzles $c$, leading from the side flues into the combustion-chamber above the hearth, headers $d$, connected with the nozzles for supplying them with fresh air, and an air-blast pipe, N, connected with the headers, substantially as described.

4. The combination of the furnace A, the combustion-chamber C, located at one side thereof, having a bottom hearth, E, and provided in its wall with a charging-opening, $e$, a flue, D, leading from the upper part of the furnace into the lower part of the combustion-chamber, a cleaning-opening, L, located in the wall of the combustion-chamber on or about a level with the hearth and between the latter and the charging-opening, and an air-blowing mechanism having a discharge-mouth extending through the wall of the combustion-chamber beneath the cleaning-opening, to prevent the gases and flame escaping through the cleaning-opening when the hearth is being cleaned during the operation of the furnace, substantially as described.

5. The combination of the furnace A, a chimney, K, having a smoke-box, J, a combustion-chamber, C, located between the furnace and chimney, having transverse contracted flues $h$ in its rear wall, and provided with a hearth, E, and a front charging-opening, $e$, the flue D, leading from the upper part of the furnace into the lower part of the combustion-chamber, an ash-pit, I, under the hearth of the combustion-chamber, a vertical flue, H, located in rear of the combustion-chamber and connecting the contracted flues with the ash-pit, and an external flue, $j$, leading from the ash-pit to the smoke-box in the chimney, substantially as described.

In testimony whereof I have hereunto set my hand and seal in the presence of two subscribing witnesses.

EDGAR G. TEED. [L. S.]

Witnesses:
 W. C. HAUFF,
 E. F. KASTENHUBER.